United States Patent
Glehr et al.

[11] Patent Number: 5,889,471
[45] Date of Patent: Mar. 30, 1999

[54] ANTI-THEFT SYSTEM FOR A MOTOR VEHICLE

[75] Inventors: Manfred Glehr, Neutraubling; Stefan Haimerl, Leonberg; Peter Voelkl, Tegernheim, all of Germany

[73] Assignee: Siemens Aktiengesellschaft, Munich, Germany

[21] Appl. No.: 610,328

[22] Filed: Mar. 4, 1996

[30] Foreign Application Priority Data

Mar. 3, 1995 [EP]  European Pat. Off. .............. 95103074

[51] Int. Cl.$^6$ .............................. H04B 1/18; B60R 25/00; B60R 25/04; G08C 19/00
[52] U.S. Cl. ................................. 340/825.31; 455/192.1; 307/10.2; 307/10.5; 340/825; 340/72
[58] Field of Search .................... 307/10.2, 10.3, 307/10.4, 10.5, 10.6; 340/825.31, 825.3, 425.5, 426; 180/287

[56] References Cited

U.S. PATENT DOCUMENTS

| | | | |
|---|---|---|---|
| 4,388,524 | 6/1983 | Walton | 235/380 |
| 4,523,178 | 6/1985 | Fulhorst | 340/825 |
| 4,688,036 | 8/1987 | Hirano et al. | 340/825 |
| 5,166,620 | 11/1992 | Panosh | 324/322 |
| 5,561,420 | 10/1996 | Kleefeldt et al. | 340/825.54 |

FOREIGN PATENT DOCUMENTS

| | | |
|---|---|---|
| 0 115 747 | 8/1984 | European Pat. Off. . |
| 0 151 087 | 6/1988 | European Pat. Off. . |
| 1145706 | 3/1969 | United Kingdom . |
| 91/16696 | 10/1991 | WIPO . |

*Primary Examiner*—Michael Horabik
*Assistant Examiner*—Anthony A. Asongwed
*Attorney, Agent, or Firm*—Herbert L. Lerner; Laurence A. Greenberg

[57] ABSTRACT

In an anti-theft system for a motor vehicle, an oscillating circuit of a transceiver in the motor vehicle is modulated with code information of a portable transponder. A demodulator detects the code information and carries it onward to a computer unit, where it is checked for authorization. Component tolerance or temperature changes can mean that initially no code information will be demodulated, despite a properly functioning transponder. According to the invention, the frequency of the modulated oscillation is then measured and reregulated to a command frequency.

7 Claims, 5 Drawing Sheets

ANTI-THEFT SYSTEM FOR A MOTOR VEHICLE

BACKGROUND OF THE INVENTION

Field of the Invention

The invention relates to an anti-theft system for a motor vehicle. It relates in particular to a system for locking the doors of a motor vehicle and to an immobilizer block, which is used to permit starting of the engine upon authorization.

A known anti-theft system (U.S. Pat. No. 4,918,955) has an ignition lock with a transmitting antenna in the form of a coil. The coil is excited by an oscillator. The ignition key has an oscillating circuit that cooperates with the transmitting coil. As soon as the ignition key is introduced into the ignition lock, encoded information is transmitted from the ignition key to the lock. If the encoded information matches command code information, a driveaway block in the motor vehicle is released so that the motor vehicle can be started.

In such systems, however, it is possible for no coded information to be detected by a receiving circuit, despite the insertion of a properly functioning ignition key. The reason therefor is that because of component tolerances or the effect of temperature, an operating point of the system has shifted so far that it is in a so-called null point.

SUMMARY OF THE INVENTION

It is accordingly an object of the invention to provide an anti-theft system for a motor vehicle, which overcomes the hereinafore-mentioned disadvantages of the heretofore-known devices of this general type and with which reliable actuation of doors or starting of the motor vehicle is possible, despite component tolerances and the effect of temperature.

With the foregoing and other objects in view there is provided, in accordance with the invention, an anti-theft system for a motor vehicle, comprising a portable transponder carrying code information; and a transceiver in a motor vehicle having an oscillating circuit with an oscillation being modulated by the transponder at a rhythm of the code information, an exciter device oscillating at an exciter frequency for inducing the oscillating circuit to oscillate, a demodulator receiving the modulated oscillation of the oscillating circuit, a security unit, and a computation unit for comparing command code information with the code information obtained from the modulated oscillation by sampling, and transmitting a release signal to the security unit if the command code information and the code information match, the exciter frequency being measured, compared with a command frequency and adjusted to match the command frequency upon a deviation, if the computation unit initially detects no code information.

A transmitter in the motor vehicle has an oscillating circuit which is inductively coupled to a key with an oscillating circuit of a portable transponder. Energy of an oscillation which is forced in the transmitter is transmitted to the transponder, which in turn transmits encoded data back to the transmitter.

The code information of the transponder modulates the amplitude of the oscillation of the transmitter oscillating circuit. A demodulator recovers the code information from the modulated oscillation, compares it with command code information, and generates a release signal if they match.

If no success is achieved when an attempt is first made to detect the code information, the exciter frequency that excites the transmitter oscillating circuit to oscillate is measured and is compared with a command frequency, and if it differs from the command frequency it is adjusted back to the command frequency.

In accordance with another feature of the invention, there is provided a transponder coil inductively coupling the transponder with the oscillating circuit of the transceiver.

In accordance with a further feature of the invention, the oscillation of the oscillating circuit is load-modulated as a function of the code information due to the inductive coupling.

In accordance with an added feature of the invention, the security unit is a door locking system or a driveaway block.

In accordance with an additional feature of the invention, the exciter device is an oscillator, and there is provided an adjustable frequency divider disposed between the oscillator and the oscillating circuit for varying the exciter frequency.

In accordance with a concomitant feature of the invention, the exciter frequency is varied by regulating the oscillator frequency.

Other features which are considered as characteristic for the invention are set forth in the appended claims.

Although the invention is illustrated and described herein as embodied in an anti-theft system for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
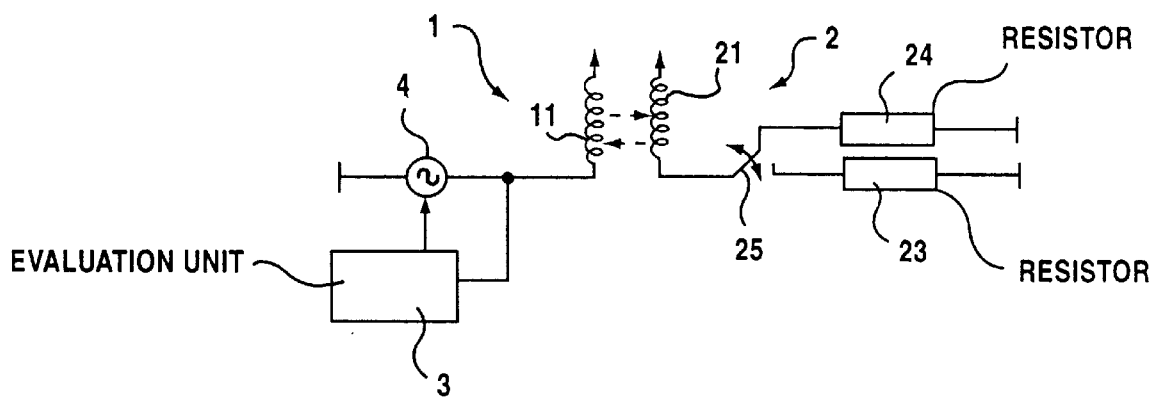
FIG. 1 is a schematic and block circuit diagram of an anti-theft system according to the invention.

Referring now to the figures of the drawing in detail and first, particularly, to FIG. 1 thereof, there is seen an anti-theft system according to the invention which has a transceiver 1 in a motor vehicle. The transceiver 1 is disposed in the vicinity of a lock, such as an ignition lock or a door lock. The transceiver 1 cooperates with a portable transponder 2 through a transformational coupling, if the transponder 2 is located in the vicinity of the transceiver 1. The transponder 2 may be disposed on an ignition or door key, or on a chip card.

The transceiver 1 transmits energy to the transponder (for this reason, the transceiver 1 will be referred to below as a transmitter). Code information stored in memory in the transponder 2 is transmitted back to the transmitter (energy transmission and return transmission of data are represented by an arrow drawn in dashed lines).

In order to provide energy transmission, the transmitter has a transmitter coil 11, which by way of example is wound around the ignition key. The transmitter coil 11 is supplied by an exciter device 4 or a frequency divider 41 seen in FIG. 2. The code information transmitted back by the transponder 2 is evaluated by an evaluation unit 3. If the code information is found to be authorized, then control signals are output accordingly.

The exciter device is constructed in the form of a generator or oscillator 4, which oscillates an alternating voltage or alternating current at the cadence of an oscillator frequency $f_O$. The oscillation is forced upon the transmitter coil 11. A field which is thereby excited by the transmitter coil 11 induces a voltage in a transponder coil 21, since the two coils 11 and 21 are inductively coupled together.

The transponder 2 has a load switch 25, which switches back and forth in a cadence, with predetermined code information stored in the transponder 2, between two load resistors 23 and 24. Since the two coils 11 and 21 are inductively coupled together (like the primary and secondary coils of a transformer, for instance), the oscillation of the transmitter is loaded by the transponder 2 in the rhythm of the code information. The code information is correspondingly transmitted back to the transmitter.

The transmitter oscillation is therefore load-modulated by the transponder 2. The code information is filtered out of the modulated oscillation, or demodulated, by the evaluation unit 3 and thus detected.

Figure 2:
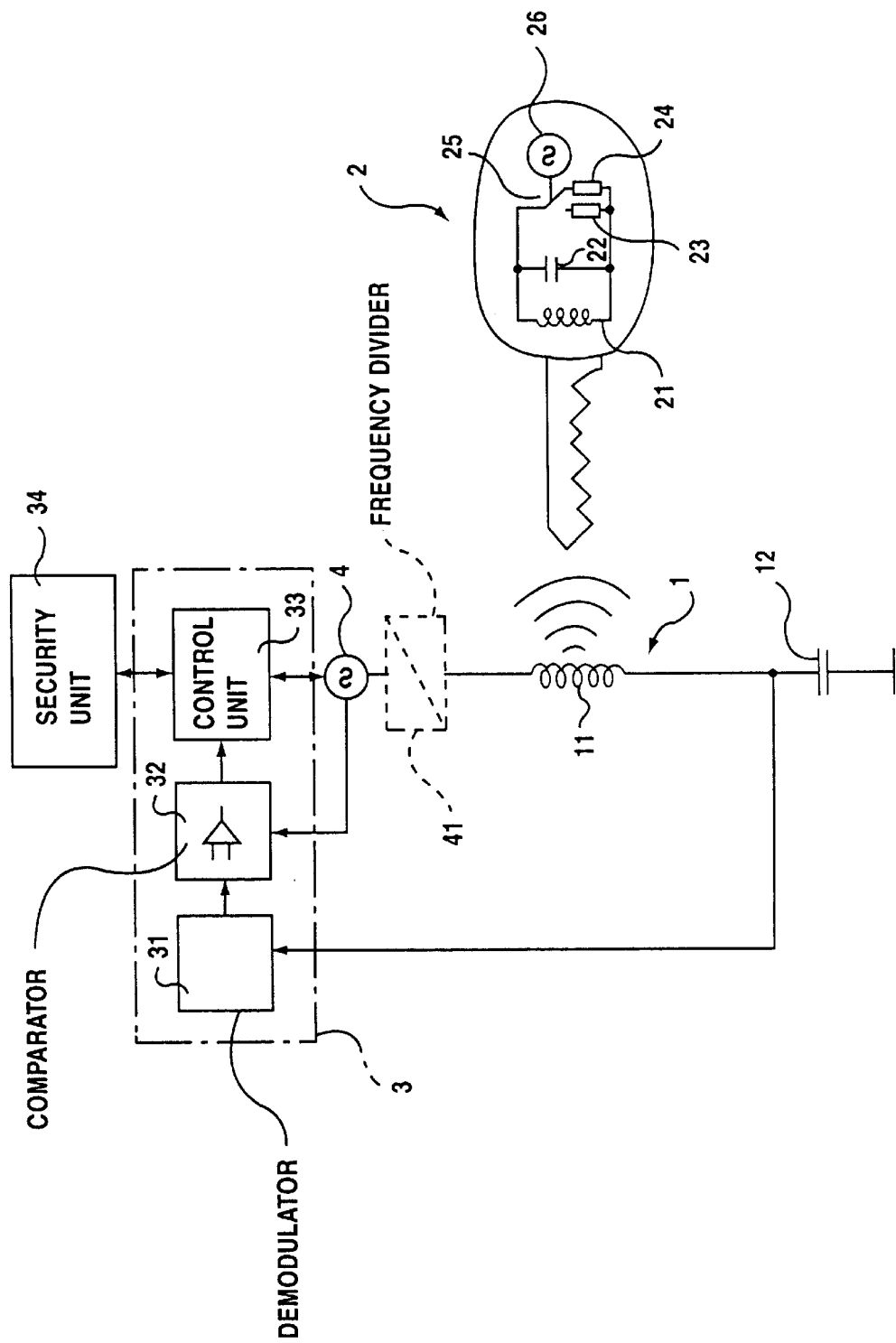
FIG. 2 is a diagrammatic, schematic and block circuit diagram of a transmitter and a receiver of the anti-theft system of FIG. 1.

Referring to FIG. 2, the transmitter coil 11, together with a transmitter capacitor 12, forms a transmitter oscillating circuit. The oscillating circuit is supplied with the oscillator frequency $f_O$ by the oscillator 4 and is thus induced to oscillation. A frequency divider 41, which divides the oscillator frequency $f_O$ downward to an exciter frequency $f_E$, may be disposed between the oscillator 4 and the oscillating circuit.

The oscillation, that is the voltage of the oscillation, is tapped between the transmitter coil 11 and the transmitter capacitor 12 and supplied to the evaluation unit 3. The evaluation unit 3 has a demodulator 31 which demodulates the oscillation. A comparator 32 compares the exciter frequency $f_E$ or a carrier frequency of the oscillation with a command or set-point frequency $f_S$. A control unit 33 controls the oscillator 4 and at least one security unit 34.

The transponder 2 likewise has an oscillating circuit with the transponder coil 21, a transponder capacitor 22, and the two load resistors 23 and 24. The load resistors 23 and 24 are connected in alternation with the transponder oscillating circuit at the rhythm of the code information by a code generator 26 through the load switch 25. As a result, the transponder oscillating circuit, and due to the inductive coupling the transmitter oscillating circuit 11 and 12, are loaded at the rhythm of the code information. There may also be a plurality of different load resistors.

The code generator 26 can take the code information from a memory and convert it into corresponding switching signals for the load switch 25. A ROM or EEPROM may be used as the memory, by way of example. The code information may also be contained in hardware form, for instance in the form of a circuit configuration, on the transponder 2. However, it is not essential to the invention how the code information is contained in the transponder 2 or how it is transmitted back to the transmitter.

A stationary forced oscillation of the transmitter oscillating circuit 11 and 12 is brought about through the use of the exciter variable, and this circuit then oscillates at the exciter frequency $f_E$. The output voltage or output current of the oscillator 4 is used as the exciter variable. Every oscillating circuit has an intrinsic frequency, which is also called a resonant frequency $f_R$, that is determined by the components of the oscillating circuit, that is by the transmitter coil 11 and the transmitter capacitor 12 (see FIG. 2). The field intensity of the transmitter coil 11 being generated is highest when the oscillating circuit is excited at the exciter frequency $f_E$ which is equal to the resonant frequency $f_R$ (see FIG. 4). It can be understood that this is the case in which the most energy is transmitted to the transponder 2.

Since a frequency divider 41 may be disposed between the oscillator 4 and the transmitter oscillating circuit 11 and 12, the oscillator frequency $f_O$ need not match the exciter frequency $f_E$. However, the transmitter oscillating circuit 11 and 12 is caused to oscillate by the exciter frequency $f_E$. When the ignition key is inserted into the ignition lock, the transmitter coil 11 and the transponder coil 21 are then in the immediate vicinity of one another. The two coils 11 and 12 are consequently inductively coupled together in such a way that the code information is transmitted to the transmitter oscillating circuit 11 and 12. Since the transponder oscillating circuit 21 and 22 is alternatively loaded with two different load resistors 23 and 24, the transmitter oscillating circuit 11 and 12 is load-modulated, specifically at the cadence at which switching takes place, back and forth between the load resistors 12 and 24 (FIG. 3).

Figure 3:
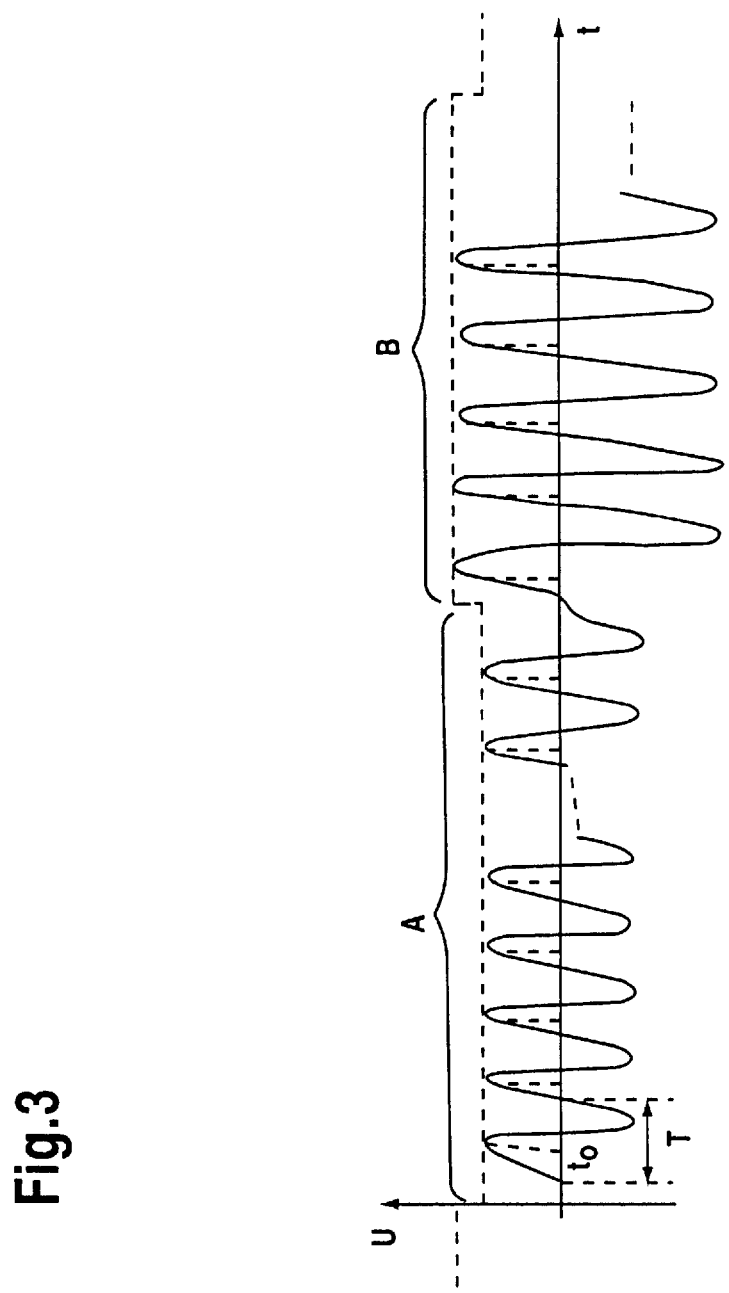
FIG. 3 is a diagram of an oscillation, modulated by a transponder, in the receiver of the anti-theft system.

Referring to FIG. 3, it is seen that the load modulation is equivalent to an amplitude modulation. The exciter frequency $f_E$ (also referred to as carrier frequency) of the modulated oscillation does not vary as a result of the loading. In a first segment A of the modulated oscillation, the first resistor loads the transmitter oscillating circuit 11 and 12, and in a next segment B, the other load resistor loads the transmitter oscillating circuit 11 and 12.

Each segment includes a plurality of periods of the exciter oscillation, each with identical successive oscillation courses each having the same period length T and the same amplitude. After each segment A or B, both the amplitude and usually the phase of the oscillation vary because of the modulation with the code information. An oscillation A during the entire length of the segment A and an oscillation B during the entire length of the segment B will therefore be discussed below, to represent the entire modulated oscillation.

The code information of the transponder 2 is contained in an envelope curve (represented in FIG. 3 by the dashed line) of the modulated oscillation. The amplitude in the segment A corresponds to a low level, for instance, and the amplitude in the segment B to a high level. The segments A and B may be of various lengths, depending on the code information (fixed lengths of time in which low and high levels are present). The evaluation unit 3 filters this code information out of the modulated oscillation. In other words, the modulated oscillation is sampled at equidistant intervals at times $t_0$, and the sampled amplitudes are measured and evaluated.

This code information is digitized and compared in the control or computation unit 33 with stored command code information. If the two items of code information match, a release signal is sent to the security unit 34 in the motor vehicle, which in turn generates a control signal. Through the use of the control signal, door locks can be locked or unlocked and the engine control system can be instructed to start the engine.

The power balance (that is, how much power is transmitted to the transponder 2 and transmitted back again from there) will be described in terms of the resonance curve in FIG. 4. In the resonance curve, the exciter frequency $f_E$ is plotted on the abscissa (X axis), and the oscillation intensity I as a consequence of the exciter variable, that is the amplitude of the exciter voltage or current, is plotted on the ordinate (Y axis). If the exciter frequency $f_E$ deviates from the resonant frequency $f_R$ defined by the components, then the intensity of the oscillation becomes less, and less energy is transmitted to the transponder 2. Below a certain power limit 51 (represented in the drawing by the two dashed lines on the left and right of the resonant frequency $f_R$), no evaluatable modulation amplitude of the oscillation can be detected. In other words, the amplitude in that case is too low because too little energy has been transmitted.

As a consequence of production tolerances in the components being used for the oscillating circuits, or as a consequence of temperature changes, in exceptional cases it is possible that while the phase between the segments A and B does vary, the amplitude does not (or only hardly varies). Due to the phase displacement, it is also possible for amplitudes of equal magnitude to be measured at the sampling times even though the envelope curve exhibits pronounced discontinuities in amplitude. The measured amplitudes in the segments A and B are then approximately equal, even though judging by the code information they should be different. When a load demodulation occurs, no change in amount is therefore detected. In other words, no code information is detected, even though the properly functioning transponder 2 is acting on the transmitter oscillating circuit 11 and 12. In such a situation, the operating point of the oscillating circuit system is at a so-called null point. Such a location of the operating point is undesirable. It could be averted with very great effort and expense, for example by selecting components with only low tolerances, or through the use of expensive temperature regulation of the entire circuit.

According to the invention, that problem is solved by measuring the frequency $f_E$ of the modulated oscillation, comparing it with a command frequency $f_S$, and if the two do not match, the frequency of the modulated oscillation is readjusted to the command frequency $f_S$.

Figure 5:
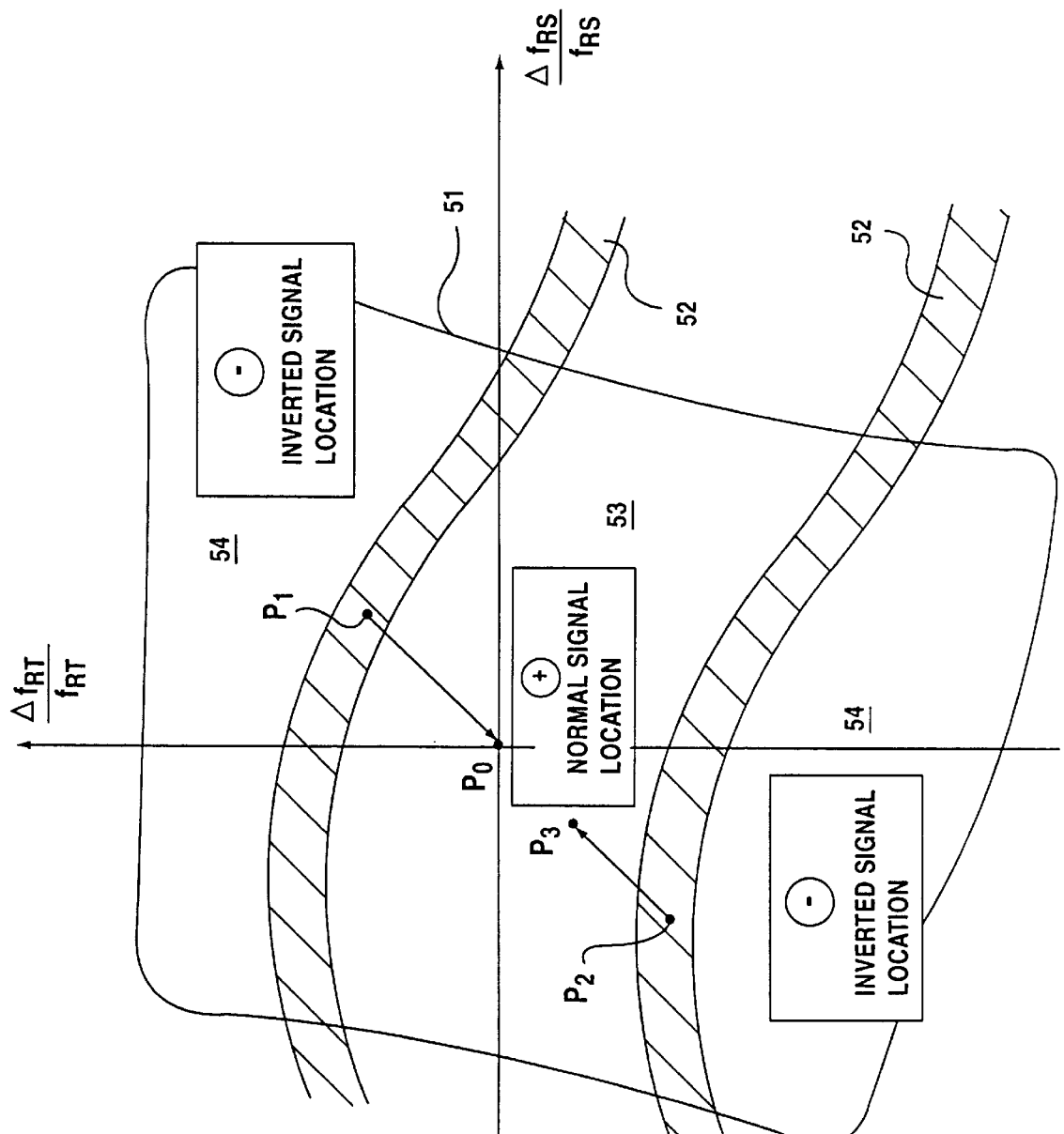
FIG. 5 is a tolerance location diagram that illustrates the location of an operating point.

FIG. 5 shows a tolerance location diagram, from which a location of an operating point and a location null point regions 52 can be seen. The operating point of the oscillating circuit system is defined by the system parameters of frequency, amplitude and phase of the modulated oscillation. The operating point is plotted as a function of the variation in the standardized resonant frequency of the transmitter, $\Delta f_{RS}/f_{RS}$ (X axis) and of the variation of the standardized resonant frequency of the transponder 2, $\Delta f_{RT}/f_{RT}$ (Y axis). Since the frequency depends on the values of the components and on the temperature, the operating point, at predetermined values for the components and at a predetermined temperature, is at a predetermined point in the X-Y plane of FIG. 5.

The location of the operating point is defined by the power limit 51, since at an operating point outside this limit, too little energy reaches the transponder 2 and thus an overly slight modulation amplitude is returned back to the demodulator 31, and as a result no demodulation is possible.

If the temperature varies, or if the values of the components vary because of component tolerances, then the operating point shifts within the X-Y plane. When an anti-theft system according to the invention is planned and dimensioned, the values are calculated in such a way that the operating point, at a certain temperature, is located as much as possible in the middle, that is at the intersection of the axes (see the operating point $P_0$). The operating point is thus located as far away as possible from the null point region 52. In that case, the operating point is in a so-called "normal signal location" 53. In extreme cases, the operating point may also be located on the far side of the null point regions, in so-called "inverted signal locations" 54, which only differ from the normal signal location 53 in their sign.

In such a normal or inverted signal location 53 or 54, the code information of the transponder 2 can be reliably extracted from the modulated oscillation, since the demodulator 31 detects a sufficiently great difference in amplitude between the amplitudes of the various segments A, B, etc.

Due to production tolerances of components or the influence of temperature, the operating point can thus shift undesirably so far that it is in a null point region 52 (shaded regions). In this region, the code information is not detected, since the amount of the amplitude has not varied, or has only varied too slightly as compared with a prior segment. The operating point must therefore be influenced in such a way that it migrates back to a reliable signal location, for instance as much as possible toward the middle.

Since both the resonant frequency $f_R$ and the oscillator frequency $f_O$ or the exciter frequency $f_E$ vary as a consequence of component tolerances and the effect of temperature, the operating point can be shifted by varying the exciter frequency $f_E$. The exciter frequency $f_E$ is therefore measured, and if it deviates from a command value it is adjusted back to it, so that it again matches the command frequency $f_S$.

In the present exemplary embodiment, the command frequency $f_S$ is 125 kHz. The exciter frequency $f_E$, if it has shifted as a result of component tolerances or the effect of temperature, is repeatedly readjusted to this command frequency.

The operating points of the system are designated by reference symbols $P_0$ through $P_3$. If the operating point $P_1$ is initially a null point (that is, if no code information is obtained the first time that the modulated oscillation is detected), then by readjustment of the exciter frequency $f_E$ the operating point is taken away from the null point, for instance to the point $P_0$ (in this respect, see FIGS. 4 and 5).

Figure 4:
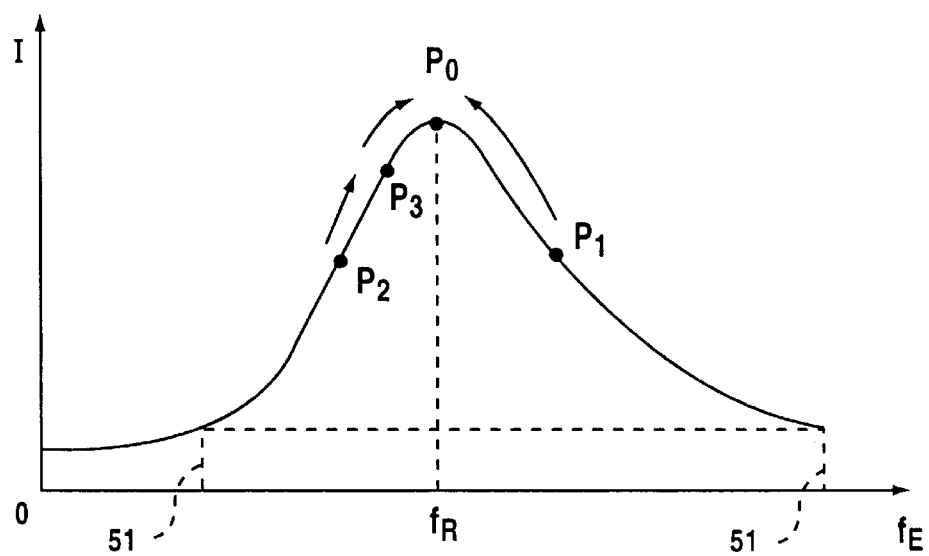
FIG. 4 is a diagram of a resonance curve of a transmitter oscillating circuit.

However, it may also happen that the system is initially at the operating point $P_2$, and that readjustment of the frequency does not cause the operating point to directly reach the point of maximum power $P_0$ but rather the operating point $P_3$ of lesser power (see FIG. 4).

In this case, in order to achieve the greatest possible power transmission to the transponder 2, the operating point can be moved in a second step in the direction of $P_0$, that is to maximum power. This can be carried out by changing the exciter frequency $f_E$ once again. The exciter frequency $f_E$ then no longer entirely matches the command frequency $f_S$. In a second step, the oscillating circuit can also be mistuned by adding an inductance or capacitance, causing the resonant frequency $f_R$ to vary and approach the exciter frequency $f_E$. However, this second step cannot be performed until after the exciter frequency $f_E$ has been readjusted to the command frequency $f_S$ in the first step.

The exciter frequency $f_E$ can be varied in various ways. For instance, the oscillator 4, which may also be provided for clocking the control unit 33, can be readjusted in analog fashion to the command frequency $f_S$ of 125 kHz. However, the digital frequency divider 41 which is connected between the oscillator 4 and the transmitter coil 11, may also be used. The frequency divider 41 can be regulated in digital increments in such a way that the exciter frequency $f_E$ is adjusted back to the command frequency $f_S$ of 125 kHz, and thus an operating point outside a null point is reliably achieved.

Figure 6:
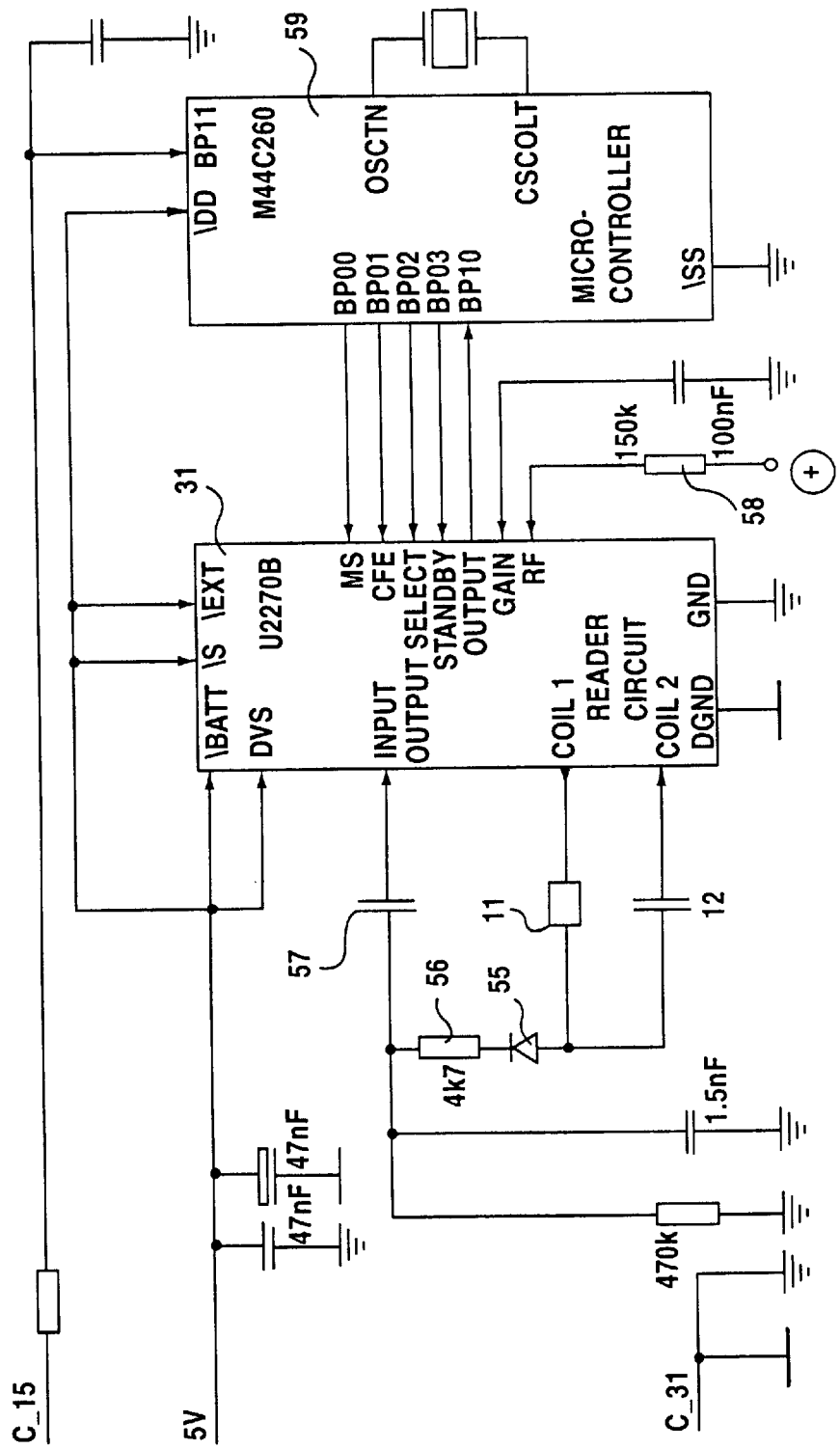
FIG. 6 is a schematic diagram of a circuit configuration of the anti-theft system according to the invention.

FIG. 6 shows a circuit configuration for the transceiver 1. A so-called READER IC (such as U2270B made by Telefunken Microelektronik) is used as the demodulator 31 and the oscillation exciter. The transmitter coil 11 is located at an output "COIL1" and is connected through the transmitter capacitor 12 to an input "COIL2" of the READER IC. The exciter frequency $f_E$ with which the oscillating circuit is excited through the output COIL1, is generated in the READER IC. The exciter frequency may be adjusted by a resistor 58 that is connected to an input "RF" of the READER IC.

The oscillation being modulated as a consequence of the approach of the transponder 2 is tapped through a diode 55, a resistor 56, and a capacitor 57, between the transmitter coil 11 and the transmitter capacitor 12, and is supplied to an input "INPUT" of the READER IC.

A separate microcontroller 59 controls the READER IC. If initially no code information is obtained, then the frequency of the modulated oscillation is measured through the input "INPUT" of the READER IC. Due to component tolerances or the effect of temperature, the oscillation frequency or exciter frequency $f_E$ does not match the command frequency $f_S$ The exciter frequency $f_E$ is therefore readjusted to the command frequency $f_S$ Subsequently, code information is again detected, because as a result of the variation in the exciter frequency $f_E$ the operating point has moved out of the null point 52. In a second step, the operating point can then be shifted as described above toward optimal power.

Measuring the frequency of the modulated oscillation is carried out in a known manner. However, the period length T of an individual oscillation course of the modulated oscillation can thus be measured directly. It is also possible to measure the time needed for one segment A, B, etc. Since the code information and thus the number of oscillations within a segment A, B, etc. is known, the frequency of the modulated oscillation can be calculated therefrom. The pulse length of the code information is therefore measured. This kind of frequency measurement is advantageous whenever the clock frequency of the microcontroller 59 is greater than the frequency of the modulated oscillation.

We claim:

1. An anti-theft system for a motor vehicle, comprising:
    a portable transponder carrying code information; and
    a transceiver in a motor vehicle having:
        an oscillating circuit with an oscillation being modulated by said transponder at a rhythm of the code information,
        an exciter device oscillating at an exciter frequency for inducing said oscillating circuit to oscillate,
        a demodulator receiving the modulated oscillation of said oscillating circuit,
        a security unit, and
        a computation unit for comparing command code information with the code information obtained from the modulated oscillation by sampling, and transmitting a release signal to said security unit if the command code information and the code information match, the exciter frequency being measured, compared with a command frequency and adjusted to match the command frequency upon a deviation, if said computation unit initially detects no code information.

2. The anti-theft system according to claim 1, including a transponder coil inductively coupling said transponder with said oscillating circuit of said transceiver.

3. The anti-theft system according to claim 2, wherein the oscillation of said oscillating circuit is load-modulated as a function of the code information due to the inductive coupling.

4. The anti-theft system according to claim 1, wherein said security unit is a door locking system.

5. The anti-theft system according to claim 1, wherein said security unit is an immobilizer system.

6. The anti-theft system according to claim 1, wherein said exciter device is an oscillator, and including an adjustable frequency divider disposed between said oscillator and said oscillating circuit for varying the exciter frequency.

7. The anti-theft system according to claim 1, wherein the exciter frequency is varied by regulating the oscillator frequency.

* * * * *